(12) United States Patent
Walker

(10) Patent No.: US 6,312,215 B1
(45) Date of Patent: Nov. 6, 2001

(54) TURBINE ENGINE WINDMILLING BRAKE

(75) Inventor: Herbert L. Walker, Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/504,527

(22) Filed: Feb. 15, 2000

(51) Int. Cl.7 ...................................................... F01D 21/00
(52) U.S. Cl. ........................ 415/9; 415/123; 60/39.091; 188/74
(58) Field of Search ................................ 415/9, 18, 119, 415/123; 416/2, 32, 169 R, 500; 60/39.091; 188/74

(56) References Cited

U.S. PATENT DOCUMENTS

| | | |
|---|---|---|
| 1,634,897 | 7/1927 | Davis . |
| 2,987,296 | 6/1961 | Ferguson, Jr. ........................... 253/59 |
| 3,048,364 | 8/1962 | Troeger et al. ......................... 253/59 |
| 3,123,282 | 3/1964 | Pothier et al. ......................... 230/114 |
| 3,175,804 | 3/1965 | Bunger .................................. 253/77 |
| 3,490,748 | 1/1970 | Hoffman ................................. 415/9 |
| 3,495,691 | 2/1970 | McLimore ............................ 188/185 |
| 3,495,919 | 2/1970 | McLimore .............................. 415/18 |
| 3,779,665 | 12/1973 | Tatem, Jr. et al. .................... 415/123 |
| 4,452,567 * | 6/1984 | Treby et al. ............................ 416/2 |
| 4,498,291 | 2/1985 | Jeffrey ................................ 60/39.091 |
| 4,503,667 | 3/1985 | Roberts .............................. 60/39.091 |
| 4,505,104 | 3/1985 | Simmons ........................... 60/39.091 |
| 5,029,439 | 7/1991 | Berneuil et al. ................... 60/39.091 |
| 6,079,200 * | 6/2000 | Tubbs ................................ 60/226.1 |

FOREIGN PATENT DOCUMENTS 2 323 637 A    9/1998   (GB) .

* cited by examiner

Primary Examiner—Edward K. Look
Assistant Examiner—Ninh Nguyen
(74) Attorney, Agent, or Firm—Kenneth C. Baran

(57) ABSTRACT

A windmilling brake system for a turbine engine includes a brake drum (14) on an interior surface of an engine rotor. The drum circumscribes a brake unit (37) that includes a brake ring (38) with brake shoes (42) each connected to the ring by respective springs (44). A leg (45) extends from each shoe and toward the ring. The ring is sandwiched axially between bolting flanges (28, 29) on forward and aft carrier portions (24, 25) of a two piece, variable stiffness, dual load path rotor bearing support. Nonsacrificial fasteners secure the ring to one of the flanges while frangible fasteners (52) secure the flanges to each other. The frangible fasteners also extend through an eye (47) in each leg to deflect the springs and hold the brake shoes in an armed state out of contact with the drum. Upon being exposed to abnormal imbalance loads, the frangible fasteners fail in tension to disable one of the two load paths. The failure also enables the springs to concurrently force the shoes into a deployed state in which the shoes contact the drum and inhibit rotor windmilling.

16 Claims, 4 Drawing Sheets

TURBINE ENGINE WINDMILLING BRAKE

TECHNICAL FIELD

This invention relates to turbine engine rotors and particularly to a brake that inhibits windmilling of a fan rotor.

BACKGROUND OF THE INVENTION

Turbofan engines for powering commercial and military aircraft include a rotatable fan for compressing a stream of ambient air. The fan includes a hub with a series of blades projecting radially outwardly therefrom. A rotatable drive shaft connects the hub to a turbine so that the turbine can power the fan. The fan and drive shaft are supported from a bearing support by ball and/or roller bearings.

On rare occasions, a fan blade may separate from the hub during engine operation, usually as a consequence of a foreign object having been ingested into the fan. The separation of a blade severely unbalances the rotating fan which, in turn, transmits tremendous forces into the load bearing components of the engine and aircraft. Accordingly, engine and aircraft designers size these components to be able to withstand severe imbalance forces. Such design practices contribute appreciable, undesirable weight to the engine and aircraft. The added weight is especially unwelcome since it accommodates an event that may never occur throughout the entire life of an engine.

To address the problem of adding weight to account for excessive but rare rotor imbalance, engine designers have devised variable stiffness bearing supports. One such bearing support features dual, parallel load paths that normally act together to provide a relatively stiff, rigid fan support. One of the load paths crosses a breakaway connection engineered to fail if subjected to abnormally high forces, such as the imbalance forces arising from a fan blade separation. Once the connection fails, the surviving load path acts alone to provide a relatively flexible or soft support for the fan. The soft, flexible support attenuates the amplitude of the imbalance forces transmitted to the bearing support and to other engine and aircraft structural components. As a result, those components may be made lighter without compromising their structural integrity.

Despite the merits of the variable stiffness bearing support, it is not without one potential shortcoming. After the blade separation event, the aircraft flight deck crew normally shuts off the fuel supply to the now heavily damaged engine and proceeds to the nearest landing site under the power of one or more undamaged engines. During this phase of flight, the forward motion of the aircraft drives ambient air into the damaged engine, causing the unbalanced fan to rotate or "windmill" at a low rotational frequency. If the fan rotor windmilling frequency is equal or approximately equal to its resonant frequency, the windmilling rotor can generate undesirably high amplitude vibrations. These vibrations, which can persist for the remaining duration of the flight, propagate into the aircraft and can be unsettling to the aircraft occupants.

What is needed is a means for suppressing resonant vibrations of a windmilling rotor following a fan blade separation.

SUMMARY OF THE INVENTION

It is, therefore, an object of the invention to suppress resonant vibrations by providing a windmill brake that precludes rotor windmilling or at least ensures that windmilling is limited to subresonant rotational frequencies. Ideally, the brake engages passively in response to abnormal rotor imbalance.

According to the invention, a brake for a turbine engine rotor includes a brake drum, a set of brake shoes and a means, responsive to rotor imbalance, for engaging the brake to inhibit relative rotary motion between the drum and the shoes.

In one detailed embodiment of the inventive brake system, the brake drum is an interior surface of an engine rotor. The drum circumscribes a brake unit. The brake unit includes a brake ring with brake shoes each connected to the ring by respective springs. A leg extends from each shoe and toward the ring. The ring is sandwiched axially between bolting flanges on forward and aft carrier portions of a two piece, variable stiffness, dual load path rotor bearing support. The bearing support, in turn, is mechanically grounded to an engine case. Nonsacrificial fasteners secure the brake ring to one of the carrier flanges while frangible fasteners secure the carrier flanges to each other. The frangible fasteners also extend through En eye in each leg to deflect the springs and hold the brake shoes in an armed state out of contact with the drum. Upon being exposed to abnormal imbalance loads, the frangible fasteners fail in tension to disable one of the load paths. The failure also releases the springs, enabling them to force the shoes into a deployed state in which the shoes contact the drum and inhibit rotary motion of the rotor relative to the case.

The invention is advantageous in that it provides a windmill braking system that responds passively (i.e. without complex control systems or pilot action) to abnormal rotor imbalance to inhibit rotor windmilling and thus guard against resonant rotor vibrations.

BEST MODE FOR CARRYING OUT THE INVENTION

Figure 4:
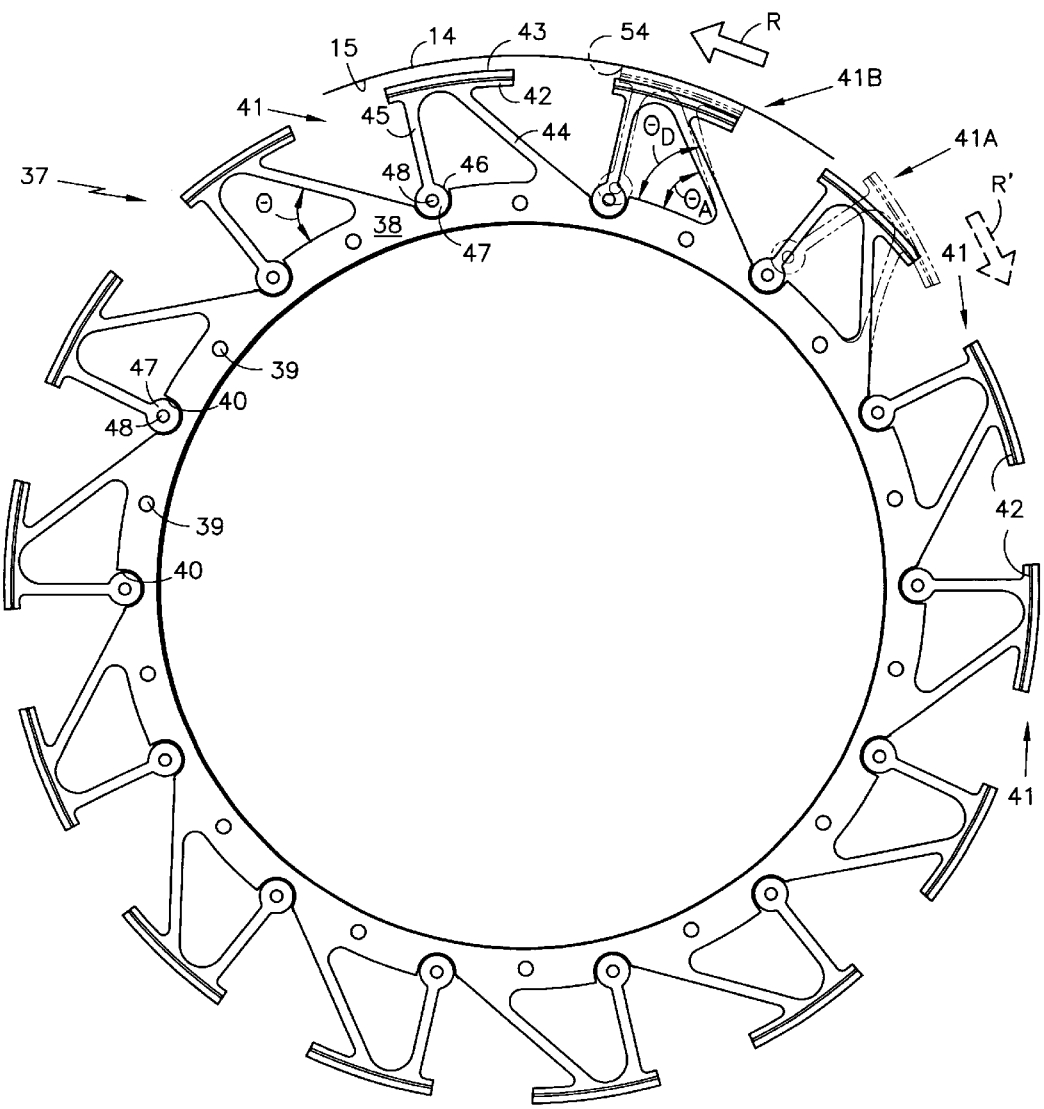
FIG. 4 is a view taken substantially in the direction 4—4 of FIG. 3 showing a brake unit of the present invention with one brake shoe illustrated in a deployed state, another brake shoe illustrated in a neutral state and multiple brake shoes illustrated in an armed state.

Referring to FIGS. 1–4, a turbofan gas turbine engine has a central rotational axis 10 and includes a rotatable fan comprising a fan hub 11 with a series of blades 12 projecting radially outwardly therefrom. A compressor drum 13 extends axially from the hub. The hub has an integral brake drum 14 with an inner braking surface 15. Multiple arrays of compressor blades, such as representative blades 16 project radially from the compressor drum. A drive shaft 17 connects the fan hub to a turbine, not shown, that rotatably drives the rotor in direction R (FIG. 4). Roller and ball bearings 18, 19 support the rotor from a variable stiffness, dual load path bearing support 20.

The bearing support 20 comprises frustoconical forward and aft bearing carriers 24, 25. The aft carrier includes radially inner and outer cones 26, 27. Bolting flanges 28, 29 extend radially from the axially adjacent extremities of the carriers. Circumferentially alternating primary and secondary bolt holes 30, 31 penetrate the flange 29 of the aft bearing carrier. Primary bolt holes 32, each circumferentially aligned with a primary bolt hole 30, penetrate flange 28 of the forward carrier. The flange 28 of the forward carrier also includes peripheral notches 35 each circumferentially aligned with a secondary hole 31 of the flange 29. The aft end of aft carrier 25 is bolted to an intermediate case 36 of the engine.

A brake unit 37 includes a brake ring 38 having circumferentially alternating apertures :39 and peripheral scallops 40. The brake unit also includes a set of brake elements 41. Each element 41 has a brake shoe 42 with a frictional brake lining 43 bonded or otherwise affixed thereto, a spring 44 connecting the shoe to the ring and a leg 45 extending from the shoe and toward the brake ring. Each leg 45 has an end 46 remote from the shoe. The remote end of each leg has an eye 47 penetrated by an opening 48.

When the brake unit 37 is installed in an engine, the brake ring is sandwiched axially between bolting flanges 28, 29 with the brake drum 14 circumscribing the unit. Nonsacrificial fasteners 49 extend through apertures 39 in the ring and through the secondary holes 31 in flange 29 to secure the ring to the aft carrier portion of the bearing support. The heads of the nonsacrificial fasteners 49 reside in the notches 35 of flange 28. Frangible fasteners 50, each having an undersized shank portion 51, secure the flanges to each other to form a releasable connection 53. The diameter of the undersized shank is selected so that the fastener breaks if subjected to abnormally high imbalance forces. Each frangible fastener also extends through the eye 47 in one of the brake legs so that the spring 44 is deflected and the eye nests in a corresponding scallop 40 in the brake ring. Thus, the frangible fasteners serve as retainers that connect the legs to the bearing support thereby retaining the brake elements 41 and their associated brake shoes 42 in an armed state, out of contact with the brake drum 14. In FIG. 4, the brake elements are illustrated in their armed state in which the spring exerts a spring force and in which the releasable connection resists the spring force to prevent the shoe from contacting the drum. Brake element 41A is also illustrated in phantom to show it in a neutral state, with its spring substantially untensioned and undeflected, as it would be prior to installation in an engine. Brake element 41B is also illustrated in phantom to show it in a deployed state described in more detail below.

Figure 1:
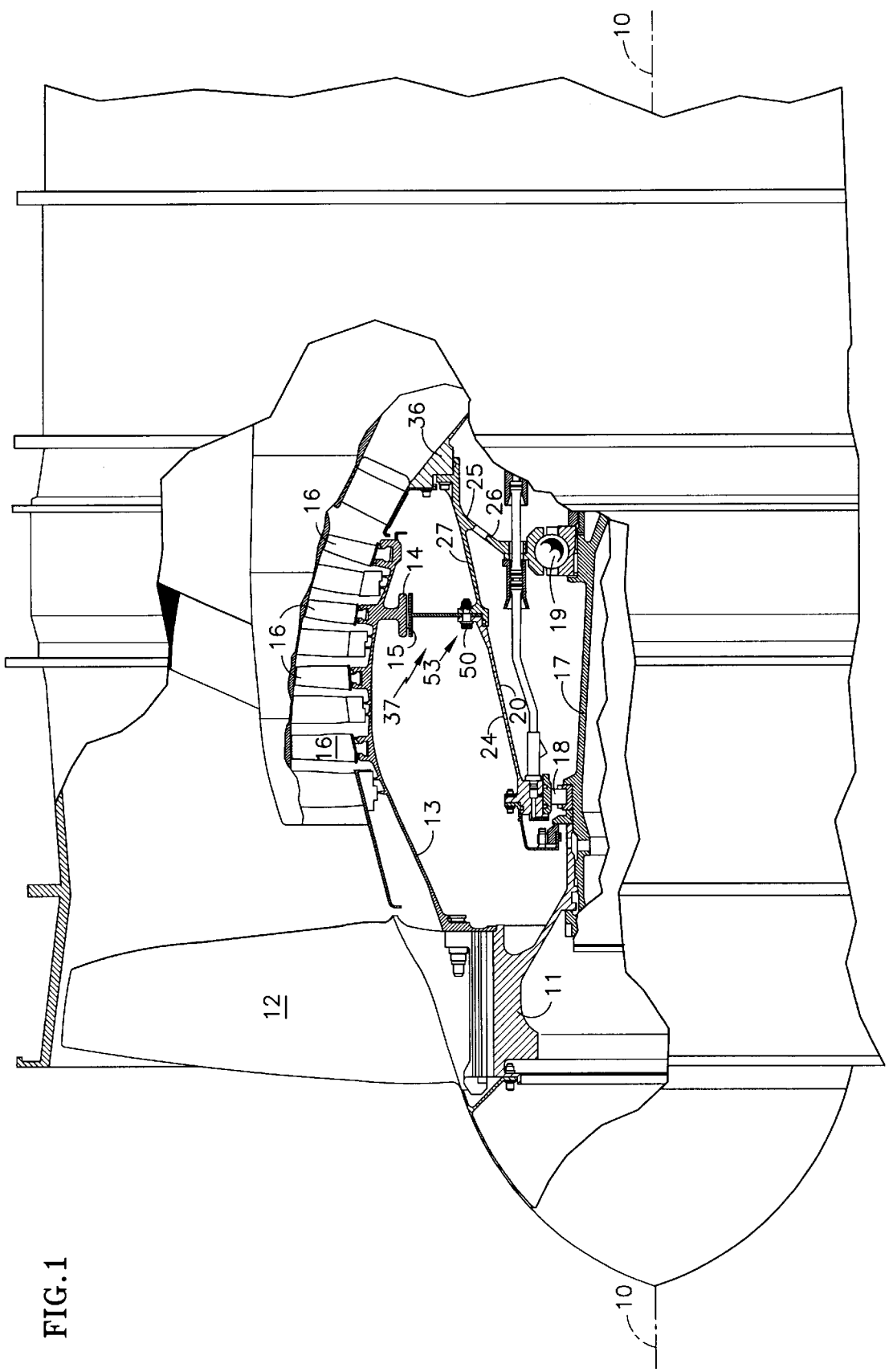
FIG. 1 is a cross sectional side elevation view of the forward end of a turbofan gas turbine engine with the engine casing partially broken away to expose a variable stiffness bearing support and to show the windmill brake of the present invention.
Figure 2:
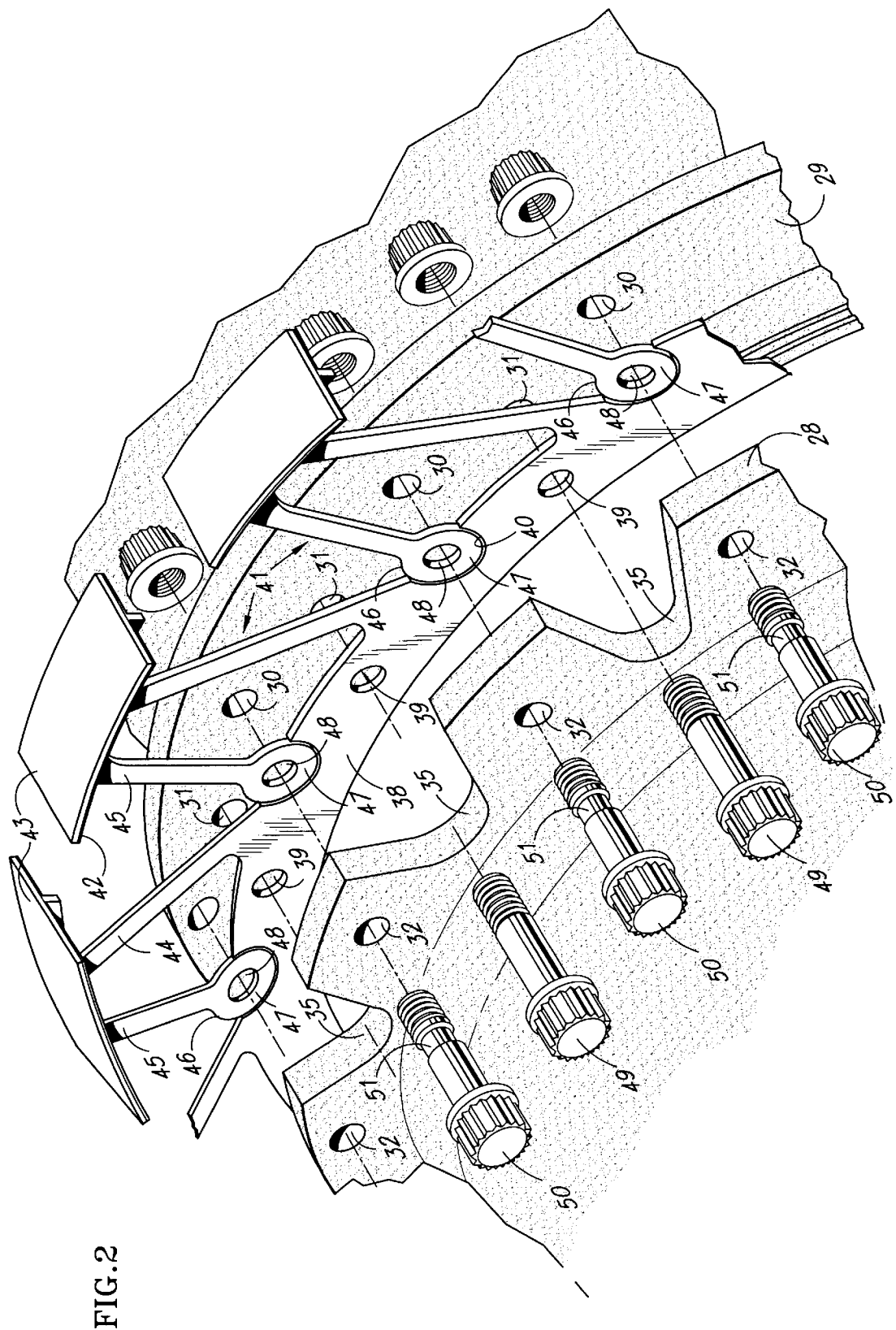
FIG. 2 is an exploded, fragmentary perspective view showing a windmilling brake unit of the present invention in relation to axially adjacent flanges of the bearing support seen in FIG. 1.
Figure 3:
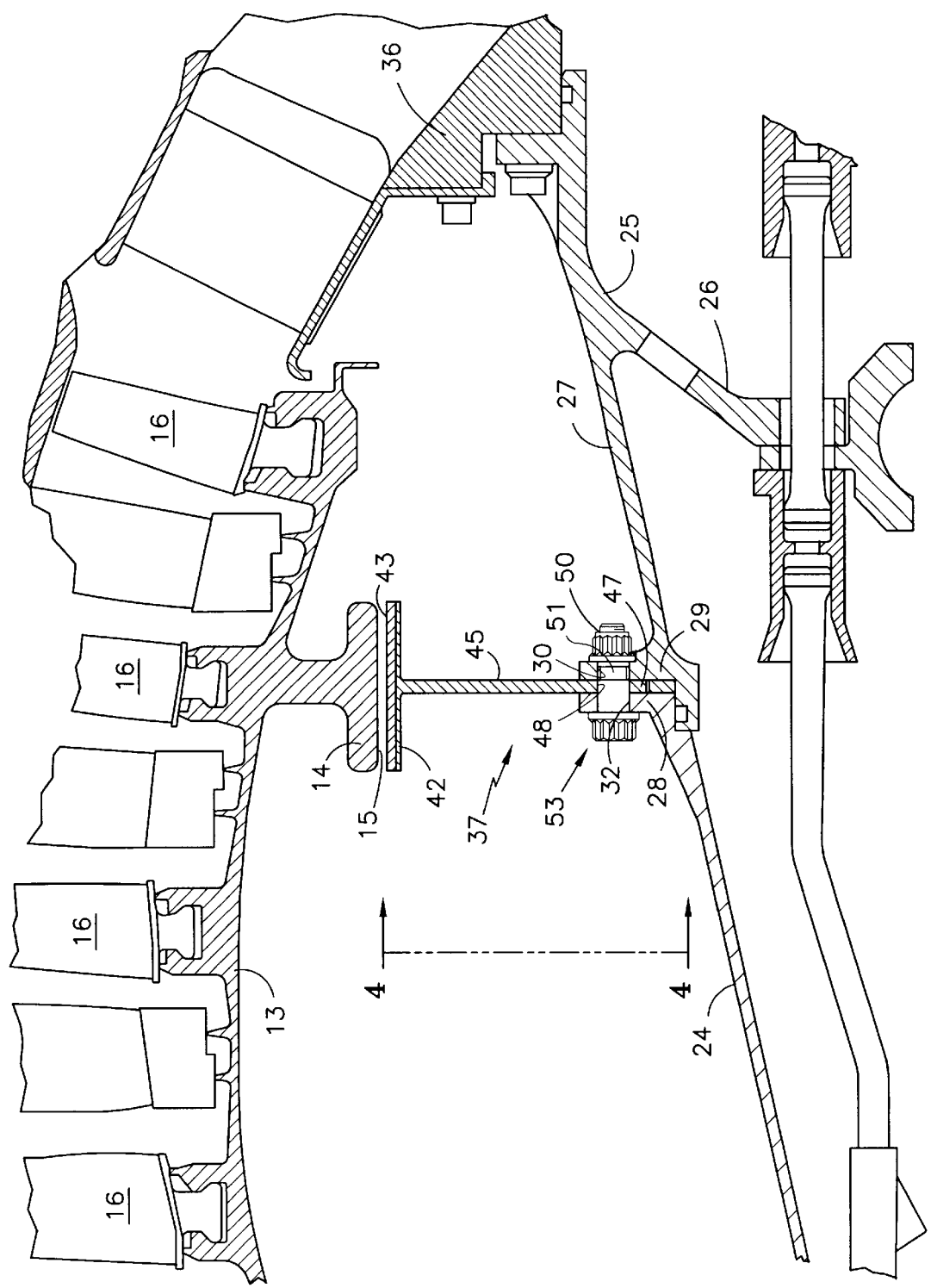
FIG. 3 is an enlarged view of a portion of FIG. 1 showing the windmill brake in greater detail.

Referring primarily to FIG. 1, the bearing support 20 features dual, parallel load paths that normally act together to provide a relatively stiff, rigid fan support. An outer load path extends through roller bearing 18, along forward bearing carrier 24, across the releasable connection 53, along outer cone 27 of the aft carrier 25 and finally into the intermediate case 36. An inner load path extends through ball bearing 19, along the inner cone 26 of aft carrier 25 and into the intermediate case 36.

During normal engine operation, the inner and outer load paths act together to convey the forces exerted by the fan (e.g. weight, inertial loads, minor imbalance loads due to manufacturing and assembly inaccuracies) to the intermediate case 36. The dual load paths provide relatively stiff, rigid support for the fan rotor. In the event that abnormally high rotor imbalance causes the load to exceed a predetermined threshold, the frangible fasteners break, disabling the outer load path and directing the loads exclusively along the inner load path. In the illustrated engine, the imbalance loads tend to pull the flanges 28, 29 apart, causing the fasteners 50 to fail in tension. The inner load path provides a relatively flexible or soft support for the fan rotor and thus attenuates the amplitude of the forces transmitted to the bearing support, the intermediate case and to other engine and aircraft components.

The failure of the frangible fasteners also releases the legs 45, thus provoking the brake elements and shoes to transition from their armed state to a deployed state. In the deployed state, as shown by the phantom illustration of brake element 41B in FIG. 4, the springs 44 cause the brake shoes to engage the drum 14. The engagement does not appreciably contribute to rotor deceleration immediately following a fan blade separation. However, after the flight deck crew shuts off the fuel supply to the engine, the contact between the shoes and the drum generates sufficient torque to inhibit relative rotary motion therebetween. The braking force is reacted by the brake ring 38, which remains connected to the aft carrier 25 by the nonsacrificial fasteners 49.

Several factors may influence the selection of the spring force exerted by the deployed springs. The spring force should not be so strong that the brake shoes grab the rotor and cause an erratic or excessively abrupt rotor deceleration. However, it is desirable that the spring force be strong enough to hasten a smooth, uneventful rotor deceleration after the fuel supply to the engine is cut off. It is preferred that the spring force be sufficiently powerful to preclude rotor windmilling. Alternatively it may be satisfactory to merely ensure that windmilling is limited to subresonant rotational frequencies.

The direction of rotor rotation establishes the preferred orientation of each spring 44 as well as the preferred polarity of the spring 44 and leg 45 of each brake element. Each spring is oriented at an acute angle $\theta$ whose magnitude increases slightly (e.g. from $\theta_A$ to $\theta_D$) in a direction opposite that of rotor rotational direction R when the brake element transitions from the armed state to the deployed state. In addition, the spring of each brake element is circumferentially "forward" or "ahead" of the leg of the same element as viewed by an observer anchored to and moving with the drum 14. Thus, the springs positively urge the brake shoes against the drum to inhibit windmilling rotation of the rotor. If the brake unit of FIG. 4 were instead used with a rotor turning in direction R', brake shoe corner 54 (the corner near the leg as opposed to the corner near the spring) could jam into the drum. As a result, the rapidly rotating rotor could damage one or more brake elements. After the rotor decelerates to low speed in response to the engine fuel supply being shut off, the damaged unit may not be capable of inhibiting windmilling as intended.

One further feature of the invention is the axial position of the undersized shank 51 of each frangible fastener 50 relative to brake leg 45. As seen best in FIG. 3, the undersized shank is entirely aft of leg 45 so that when the frangible fastener breaks into two fragments, it does so at a site axially aft of the leg. Accordingly, the forward fragment of the broken fastener extends through flange 28 and through eye 47 of brake leg 45. However the tensile forces that tend to separate flange 28 from flange 29 forcibly and almost immediately eject the forward fragment from the flange 28 and from leg 45 so that the brake element can move to its deployed state. The aft fragment, even if it remains wedged in hole 30 of flange 29, does not extend into the eye 47 and therefore cannot interfere with brake deployment. By contrast, if either fragment were to remain positioned in its bolt hole 30 or 32 and were also to extend into the eye 47, the corresponding brake element would fail to deploy and the effectiveness of the brake would be degraded.

Although the invention has been described with reference to a preferred embodiment thereof, those skilled in the art will appreciate that various changes, modifications and adaptations can be made without departing from the invention as set forth in the accompanying claims.

I claim:

1. A brake for a turbine engine rotor, comprising:
   a brake drum;
   a brake unit including a set of brake shoes, each shoe having an armed state in which each shoe is prevented from contacting the drum and also having a deployed state in which each shoe engages the drum to inhibit relative rotary motion between the drum and the shoes; and
   means, responsive to rotor imbalance exceeding a predetermined threshold, for provoking a transition from the armed state to the deployed state.

2. The brake of claim 1 wherein the drum is a radially interior surface of an engine compressor.

3. The brake of claim 1 wherein the brake unit is circumscribed by the rotor.

4. The brake of claim 1 wherein the brake unit comprises a spring for urging each shoe into contact with the drum in the deployed state and a leg connected to a support for preventing the shoe from contacting the drum in the armed state.

5. The brake of claim 4 wherein the support is a bearing support for the rotor.

6. The brake of claim 1 wherein the imbalance responsive means is a set of frangible retainers that prevent the shoes from contacting the drum in the armed state and that break to provoke the transition to the deployed state.

7. A brake for a turbine engine rotor, comprising:
   a brake drum;
   a brake unit including a brake ring and a set of brake elements, each brake element comprising a brake shoe, a spring connecting the shoe to the ring and a leg extending from the shoe and toward the ring;
   a releasable connection connecting the legs to a support;
   each brake element having an armed state in which the spring exerts a spring force and in which the releasable connection resists the spring force to prevent the shoe from contacting the drum and each brake element also having a deployed state in which the spring force urges the shoe into contact with the drum.

8. The brake of claim 7 wherein the drum is a radially inner surface of a rotatable engine compressor.

9. The brake of claim 7 wherein the brake unit is circumscribed by the rotor.

10. The brake of claim 7 wherein the support is a bearing support for the rotor.

11. The brake of claim 7 wherein the releasable connection comprises a set of frangible retainers that break to provoke a transition from the armed state to the deployed state.

12. A brake for a turbine engine rotor, comprising:
    a brake drum on a radially inner surface of the rotor;
    a brake unit including a brake ring and a set of brake elements, each brake element comprising a brake shoe, a spring connecting the shoe to the ring and a leg extending from the shoe and toward the ring; the brake unit being connected to a nonrotatable bearing support, the bearing support being mechanically grounded to an engine case;
    a releasable connection connecting the legs to the bearing support;
    each brake element having an armed state in which the spring exerts a spring force and in which the releasable connection resists the spring force to prevent the shoe from contacting the drum and each brake element also having a deployed state in which the spring force urges the shoe into contact with the drum.

13. A brake unit for a turbine engine, comprising:
    a brake ring having apertures extending therethrough and also having a plurality of peripheral scallops;
    a set of brake elements, each element comprising a brake shoe, a spring connecting the shoe to the ring and a leg extending from the shoe and toward the ring, the leg having an inner end terminating in an eye with an opening extending through the eye;
    the brake elements each having a neutral state in which the spring is substantially undeflected and a deflected state in which the spring is deflected and each eye nests in a corresponding scallop.

14. The brake carrier of claim 13 comprising a brake lining affixed to each shoe.

15. A brake system for a turbine engine rotor, comprising:
    a brake drum on the interior of the rotor;
    a bearing support for supporting the rotor on bearings, the bearing support having a forward carrier and an aft carrier, each carrier having a respective bolting flange with primary holes extending therethrough, one of the flanges having secondary holes extending therethrough;
    a brake unit including a brake ring having a set of apertures extending therethrough, the brake unit being connected to the bearing support by fasteners that extend through the apertures and through the secondary holes in the one flange, the brake unit also including a set of brake elements, each brake element comprising a brake shoe, a spring connecting the shoe to the ring and a leg extending from the shoe, the leg having an end remote from the shoe, the remote end having an eye with an opening extending through the eye, each leg being connected to the bearing support by a frangible fastener that extends through the eye and through one of the primary bolt holes in each flange.

16. The brake system of claim 15 wherein the brake ring has a plurality of peripheral scallops distributed circumferentially intermediate the bolt holes and wherein the eyes nest in the scallops.

* * * * *